United States Patent [19]

Tsukahara et al.

[11] Patent Number: 4,978,898

[45] Date of Patent: Dec. 18, 1990

[54] MOTOR DRIVING AND MALFUNCTION DETECTING DEVICE

[75] Inventors: Akihiko Tsukahara; Toshio Iwaoka; Yuichi Yamaguchi; Tsutomu Danzaki, all of Yokohama, Japan

[73] Assignee: Jidosha Denki Kogyo Kabushiki Kaisha, Kanagawa, Japan

[21] Appl. No.: 462,208

[22] Filed: Jan. 9, 1990

[30] Foreign Application Priority Data

Jan. 11, 1989 [JP] Japan .................................. 1-5325

[51] Int. Cl.⁵ .................................... H02P 1/22
[52] U.S. Cl. .................................... 318/280; 318/293; 318/294; 318/490; 340/653
[58] Field of Search ............... 318/280, 293, 294, 558, 318/565, 636, 638, 490; 340/510, 511, 644, 653

[56] References Cited

U.S. PATENT DOCUMENTS

| 4,494,181 | 1/1985 | Ramlohr et al. | 318/280 X |
| 4,675,560 | 6/1987 | Stroppiana | 307/570 |
| 4,841,286 | 6/1989 | Kummer | 340/653 |

Primary Examiner—Bentsu Ro
Attorney, Agent, or Firm—Sughrue, Mion, Zinn, Macpeak & Seas

[57] ABSTRACT

A motor driving device is provided with switches connected with both terminals of a motor in an H-bridge connection and malfunction detectors connected with both terminals of said motor. The malfunction detectors are comprised of an impression part and a detection part which can detect the breakdown of the respective switches caused by open breakage or short breakage according to an output signal from the detection part corresponding to an input signal from the impression part.

1 Claim, 2 Drawing Sheets

MOTOR DRIVING AND MALFUNCTION DETECTING DEVICE

BACKGROUND OF THE INVENTION

1. Field of the Invention

This invention relates to a motor driving device used for driving a motor in the forward and reverse direction.

2. Description of the Prior Art

Heretofore, there have been known various types of motor driving devices having different circuit formation. One of them has circuit formation shown in FIG. 2 for example.

A motor driving device 101 shown in FIG. 2 has circuit formation comprising a switching part Q1 for supplying a current in the forward rotational direction to a motor 102 which is rotatable in the forward and reverse direction, a switching part Q2 for supplying said motor 102 with a current in the reverse rotational direction, a switching part Q3 for grounding the current in the forward rotational direction through the motor 102, a switching part Q4 for grounding the current in the reverse rotational direction through the motor 102, diodes D1 to D4 for protecting said respective switching parts Q1 to Q4 from back electromotive force and detection parts 103 and 104 connected with both terminals of said motor 102 for detecting rotational conditions of said motor 102. The respective switching parts Q1 to Q4 are connected with both terminals of said motor 102 in H-bridge connection (hereupon, respective switching parts Q1 to Q4 are indicated with equivalent circuits).

Said motor driving device 101 is so designed as to drive the motor 102 in the direction of forward or reverse rotation by turning on or off the respective switching parts Q1 to 04 according to instructions from a microcomputer for example, and to detect conditions of the motor 102 using the microcomputer through the detection parts 103 and 104.

However, in the conventional motor driving device 101 described above, it is merely possible to detect a breakdown of either switching parts Q1, Q2 or Q3, Q4 because rotational conditions of the motor 102 are detected by the detection parts 103 and 104 when the switching parts Q1 to Q4 break down by open breakage or short breakage. There is a problem since it is not possible to detect all conditions of the switching parts Q1 to Q4.

SUMMARY OF THE INVENTION

The invention is made in view of the above mentioned problem of the prior art and it is an object to provide a motor driving device which is possible to detect conditions of all of switching means connected in H-bridge connection.

In order to accomplish the above mentioned object, according to this invention, the construction of motor driving device is characterized in that it has switching means connected with both terminals of a motor in H-bridge connection for driving said motor in the forward or reverse direction by switching said respective switching means, and said both terminals of the motor are connected to respective malfunction detecting means having an impression part to impress a detecting voltage on said respective switching means and a detection part to detect a voltage level of said impression part for detecting the malfunction of respective switching means according to an output signal from the detection part corresponding to an input signal to said impression part.

In the motor driving device according to this invention which has above mentioned construction, when the respective switching means is impressed with a detecting voltage from the impression part of the malfunction detecting means, operating the respective switching means according to respective modes, that are a forward rotational mode, a reverse rotational mode and a stop mode of the motor, whether the respective switching means are normal or not is detected according to an output signal from the detection part corresponding to an output signal to said impression part and the switching means breaking down is detected whether the breakdown is caused by open breakage or short breakage.

DESCRIPTION OF THE PREFERRED EMBODIMENT

An embodiment of the motor driving device according to this invention will be described below on basis of FIG. 1.

Figure 1:
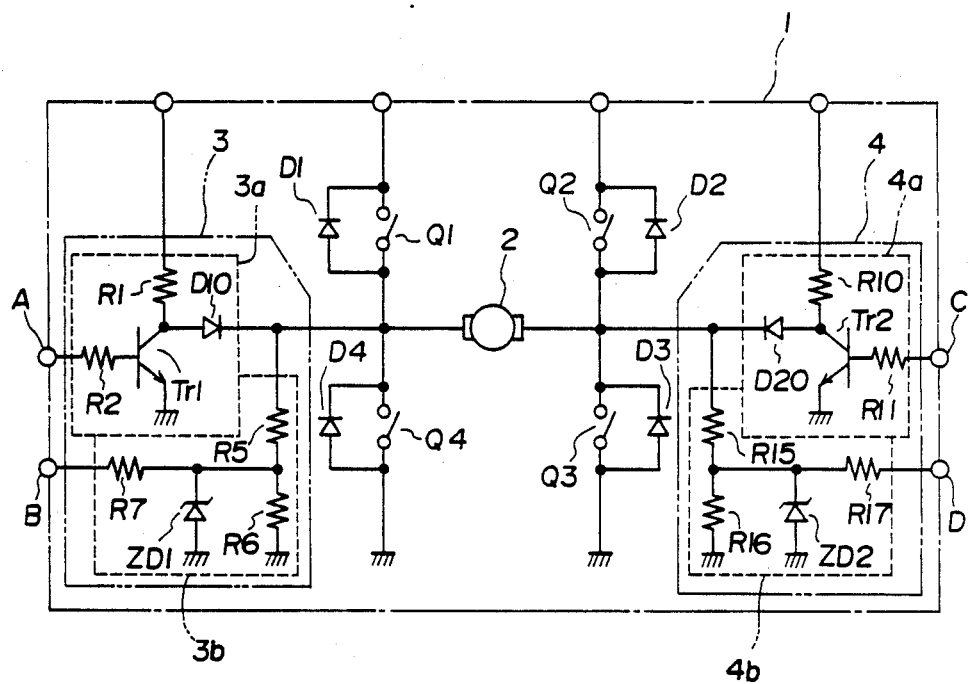
FIG. 1 is a diagram showing the circuit formation of an embodiment of the motor driving device according to this invention.
Figure 2:
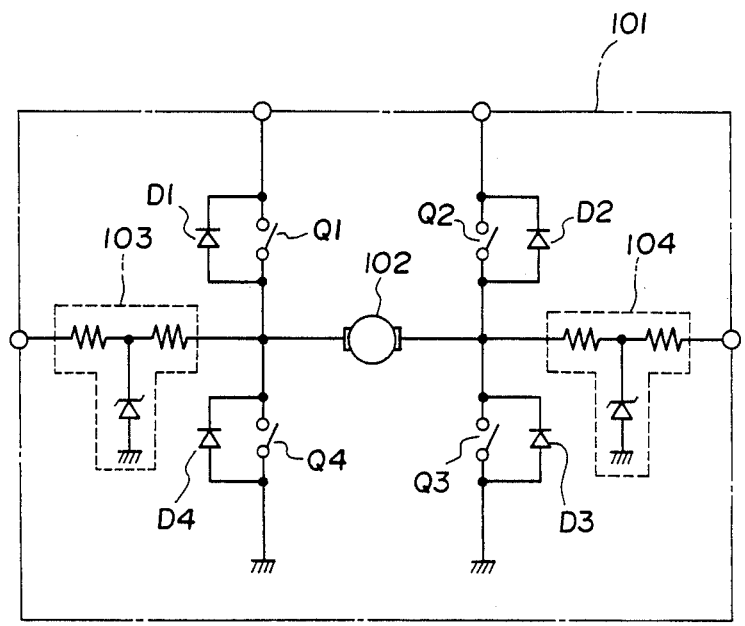
FIG. 2 is a diagram showing the circuit formation of the conventional motor driving device.

FIG. 1 is a diagram showing the circuit formation of an embodiment of the motor driving device according to this invention.

In FIG. 1, numeral 1 is a motor driving device, said motor driving device 1 has circuit formation provided with a switching part Q1 for supplying a current in the forward rotational direction to a motor 2 which is rotatable in the forward and reverse direction, a switching part Q2 for supplying said motor 2 with a current in the reverse rotational direction, a switching part Q3 for grounding the current in the forward rotational direction through the motor 2, a switching part Q4 for grounding the current in the reverse rotational direction through the motor 2, diodes D1 to D4 for protecting said respective switching parts Q1 to Q4 from back electromotive force respectively, a first malfunction detecting circuit 3 and a second malfunction detecting circuit 4 connected with both terminals of said motor 2 respectively and for detecting the malfunction of respective switching parts Q1, Q4 and respective switching parts Q2, Q3 according to an output voltage in response to an input voltage. The respective switching parts Q1 to Q4 are connected with both terminals of said motor 2 in H-bridge connection (hereupon, respective switching parts Q1 to Q4 are indicated with equivalent circuits).

Said first malfunction detecting circuit 3 is provided with a first impression part 3a for impressing a detecting voltage on the switching parts Q1 and Q4, and with a first detection part 3b for detecting a voltage level of said first impression part 3a.

Said second malfunction detecting circuit 4 is provided with a second impression part 4a for impressing a detecting voltage on the switching parts Q2 and Q3 and with a second detection part 4b for detecting a voltage level of said second impression part 4a.

Said first impression part 3a is provided with a npn-type transistor Tr1 for supplying a detecting voltage, a diode D10, and resistors R1 and R2, and impresses the detecting voltage on the switching parts Q1 and Q4 by actuating the transistor Tr1 through a check port A using, for example, a microcomputer or the like.

Said first detection part 3b in provided with a zener diode ZD1 and resistors R5, R6 and R7. and inputs the voltage level regulated by the resistors R5 to R7 into, for example. the microcomputer or the like through a check port B.

Said second impression part 4a is provided with a npn-type transistor Tr 2 for supplying a detecting voltage. a diode D20, and resistors R10 and R11, and impresses the detecting voltage on the switching parts Q2 and Q3 by actuating the transistor Tr2 through a check port C using, for example, the microcomputer or the like.

Said second detection part 4b is provided with a zener diode ZD2 and resistors R15. R16 and R17, and inputs the voltage level regulated by the resistors R15 to R17 into, for example, the microcomputer or the like through a check port D.

In the motor driving device having above mentioned construction, the detecting of the malfunction of the respective switching parts Q1 to Q4 will be explained on basis of Table 1.

C into "0", it is found that the switching part Q3 is normal for the present.

In mode No. 1, if the output signal "1" from the check port B is detected in case the input signal to the check port A is "1", it is found that short breakage arises in the switching part Q1.

In mode No. 2, if the output signal "0" from the check port B is detected in case the input signal to the check port A is "0", it is found that short breakage arises in the switching part Q4.

In mode No. 3, if the output signal "1" from the check port D is detected in case the input signal to the check port C is "1", it is found that short breakage arises in the switching part Q2.

Furthermore, in mode No. 4, if the output signal "0" from the check port D is detected in case the input signal to the check port C is "0", it is found that short breakage arises in the switching part Q3.

Next, a forward rotational mode shown in Table 1 at Nos. 5 and 6 will be explained.

In the forward rotational mode, the switching parts Q1 and Q3 are made into ON-states and the switching parts Q2 and Q4 are made into OFF-states. In this state, when the transistor Tr1 comes into ON-state and the output signal "1" is detected from the check port B by making the input signal to the check port A into "1", it is judged that the switching part Q1l is entirely normal

TABLE 1

| No. | OUTPUT MODE OF MOTOR | | SWITCHING PART | EXISTENCE OF MALFUNCTION | CHECK PORT SIGNAL | | | |
|---|---|---|---|---|---|---|---|---|
| | | | | | A | B | C | D |
| 1 | STOP($Q_1 \sim Q_4$ :OFF) | | Q1 | NORMAL | 1 | 0 | — | — |
| | | | | SHORT BREAKAGE | 1 | 1 | — | — |
| 2 | " | | Q4 | NORMAL | 0 | 1 | — | — |
| | | | | SHORT BREAKAGE | 0 | 0 | — | — |
| 3 | " | | Q2 | NORMAL | — | — | 1 | 0 |
| | | | | SHORT BREAKAGE | — | — | 1 | 1 |
| 4 | " | | Q3 | NORMAL | — | — | 0 | 1 |
| | | | | SHORT BREAKAGE | — | — | 0 | 0 |
| 5 | FORWARD ROTATION | $Q_1,Q_3$ :ON  $Q_2,Q_4$ :OFF | Q1 | NORMAL | 1 | 1 | — | — |
| | | | | OPEN BREAKAGE | 1 | 0 | — | — |
| 6 | FORWARD ROTATION | $Q_1,Q_3$ :ON  $Q_2,Q_4$ :OFF | Q3 | NORMAL | — | — | 1 | 0 |
| | | | | OPEN BREAKAGE | — | — | 1 | 1 |
| 7 | REVERSE ROTATION | $Q_1,Q_3$ :OFF  $Q_2,Q_4$ :ON | Q4 | NORMAL | 1 | 0 | — | — |
| | | | | OPEN BREAKAGE | 1 | 1 | — | — |
| 8 | REVERSE ROTATION | $Q_1,Q_3$ :OFF  $Q_2,Q_4$ :ON | Q2 | NORAL | — | — | 1 | 1 |
| | | | | OPEN BREAKAGE | — | — | 1 | 0 |

First of all, a stop mode of the motor shown in Table 1 with Nos. 1 to 4 will be explained.

When the motor is not driven, all the switching parts Q1 to Q4 are in the OFF-state. In this state, when the transistor Tr1 comes into ON-state and an output signal "0" is detected from the check port B by making an input signal to the check port A into "1", it is found that the switching part Q1 is normal for the present (but there is the possibility of open breakage). When the transistor Tr1 comes into OFF-state and an output signal "1" is detected from the check port B by making the input signal to the check port A into "0", it is found that the switching part Q4 is normal for the present. When the transistor Tr2 comes into ON-state and the output signal "0" is detected from the check port D by making the input signal to check port C into "1", it is found that the switching part Q2 is normal for the present. Furthermore, when the transistor Tr2 comes into OFF-state and the output signal "1" is detected from the check port D by making the input signal to check port in case the switching part Q1 is found to be normal in the aforementioned mode No. 1. When the transistor Tr2 comes into ON-state and the output signal "0" is detected from the check port D by making the input signal to the check port C into "1", it is judged that the switching part Q3 is entirely normal in case the switching part Q3 is found to be normal in the aforementioned mode No. 4. Hereupon, in mode no. 5, if the output signal "0" from the check port B is detected, it is found that open breakage arises in the switching part Q1.

In mode No. 6, if the output signal "1" from the check port D is detected, it is found that open breakage arises in the switching part Q3.

Lastly, a reverse rotational mode shown in Table 1 at Nos. 7 and 8 will be explained.

In the reverse rotational mode, the switching parts Q1 and Q3 are made into OFF-states and the switching parts Q2 and Q4 are made into ON-states. In this state, when the transistor Tr1 comes into ON-state and the output signal "0" is detected from the check port B by making the input signal to the check port A into "1", it is judged that the switching part Q4 is entirely normal in case the switching part Q4 is found to be normal in the aforementioned mode No. 2. When the transistor Tr2 comes into ON-state and the output signal "1" is detected from the check port D by making the input signal to the check port C into "1", it is judged that the switching part Q2 is entirely normal in case the switching part Q2 is found to be normal in the aforementioned mode No. 3. Hereupon in mode No. 7, if the output signal "1" form the check port B is detected, it is found that open breakage arises in the switching part Q4.

In mode No. 8, if the output signal "0" from the check port D is detected, it is found that open breakage arises in the switching part Q2.

Accordingly, it becomes possible to detect whether the short breakage or the open breakage arises in the switching parts Q1 to Q4 using, for example, the microcomputer by connecting the respective check ports A to D with the microcomputer.

Additionally, although the switching means Q1 to Q4 are described with equivalent circuits of the transistors in the embodiment mentioned above, field-effect transistors (FET), relays or the like may be used for switching means Q1 to Q4.

As explained above, the motor driving device according to this invention has switching means connected with both terminals of a motor in H-bridge connection for driving said motor in the forward or reverse direction by switching said respective switching means, and said both terminals of the motor are connected to respective malfunction detecting means having an impression part to impress a detecting voltage on said respective switching means and a detection part to detect a voltage level of said impression part for detecting the malfunction of respective switching means according to an output signal from the detection part corresponding to an input signal to said impression part. Therefore, it is possible to detect the breakdown of respective switching means due to the open breakage or the short breakage by the malfunction detecting means, and excellent effect is obtained since it is possible to prevent the motor from the continuous rotation in the forward or reverse direction.

What is claimed is:

1. A motor driving and malfunction detecting device for an electric motor having two terminals, comprising:
a plurality of switching means, each connected to one terminal of said motor in an H-bridge connection for driving said motor in a forward or reverse direction by switching said respective switching means;
a plurality of malfunction detecting means, each of said malfunction detecting means is connected to one terminal of said motor;
each of said malfunction detecting means having an impression part and a detecting part, wherein the impression part inputs a voltage to said respective switching means, the detection part detects a voltage level responsive to the input voltage of the impression part for determining the malfunction of the respective switching means.

* * * * *